United States Patent [19]
Kwak

[11] Patent Number: 5,253,002
[45] Date of Patent: Oct. 12, 1993

[54] COMPACT CAMERA WITH DEPLOYABLE FLASH UNIT

[75] Inventor: Debby H. Kwak, Cerritos, Calif.

[73] Assignee: Eastman Kodak Company, Rochester, N.Y.

[21] Appl. No.: 917,656

[22] Filed: Jul. 23, 1992

[51] Int. Cl.⁵ .......................................... G03B 15/02
[52] U.S. Cl. ................................... 354/126; 354/219
[58] Field of Search ................ 354/126, 129, 145.1, 354/149.11, 219

[56] References Cited
U.S. PATENT DOCUMENTS 3,685,414  8/1972  Good ........................... 354/204
4,299,465  11/1981  Chan .......................... 354/145.1
4,589,747  5/1986  Nakayama et al. ........... 354/149.11
4,831,399  5/1989  Tsurukawa et al. ........... 354/221

OTHER PUBLICATIONS

U.S. Ser. No. 637,855, filed Jan. 7, 1991.

Primary Examiner—Michael L. Gellner
Assistant Examiner—Howard B. Blankenship
Attorney, Agent, or Firm—Roger A. Fields

[57] ABSTRACT

A compact camera comprises a flash unit and a viewfinder airspace. The flash unit and viewfinder airspace are relatively sized to fit the flash unit into the viewfinder airspace for storage purposes.

7 Claims, 3 Drawing Sheets

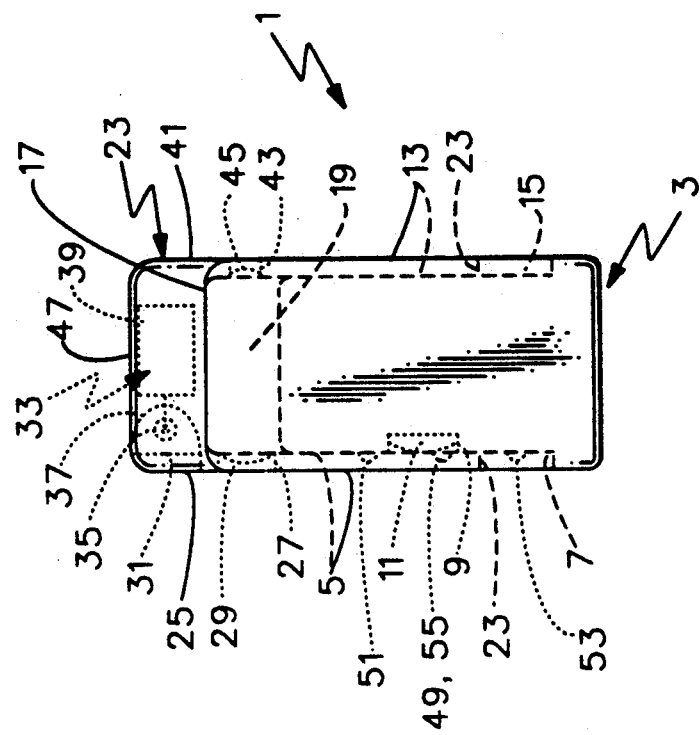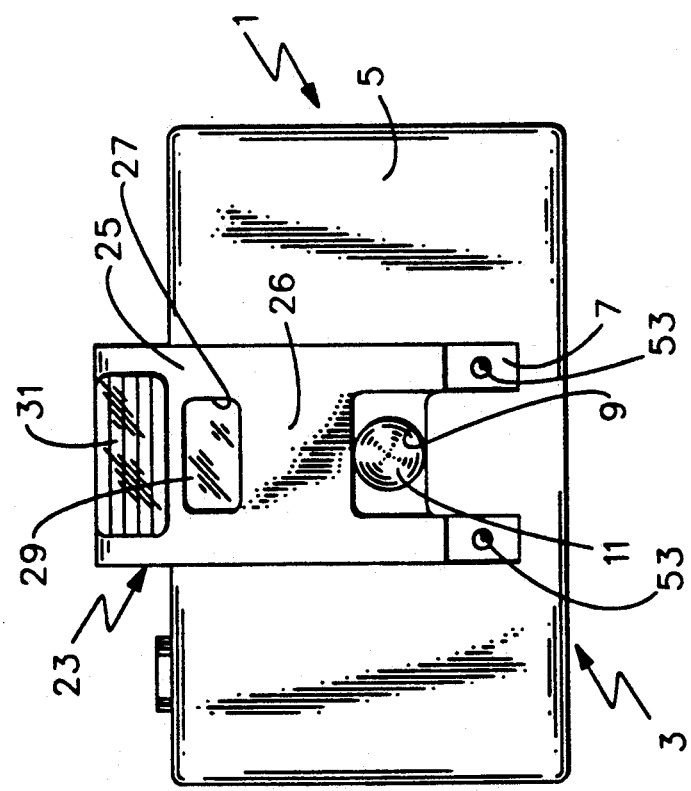

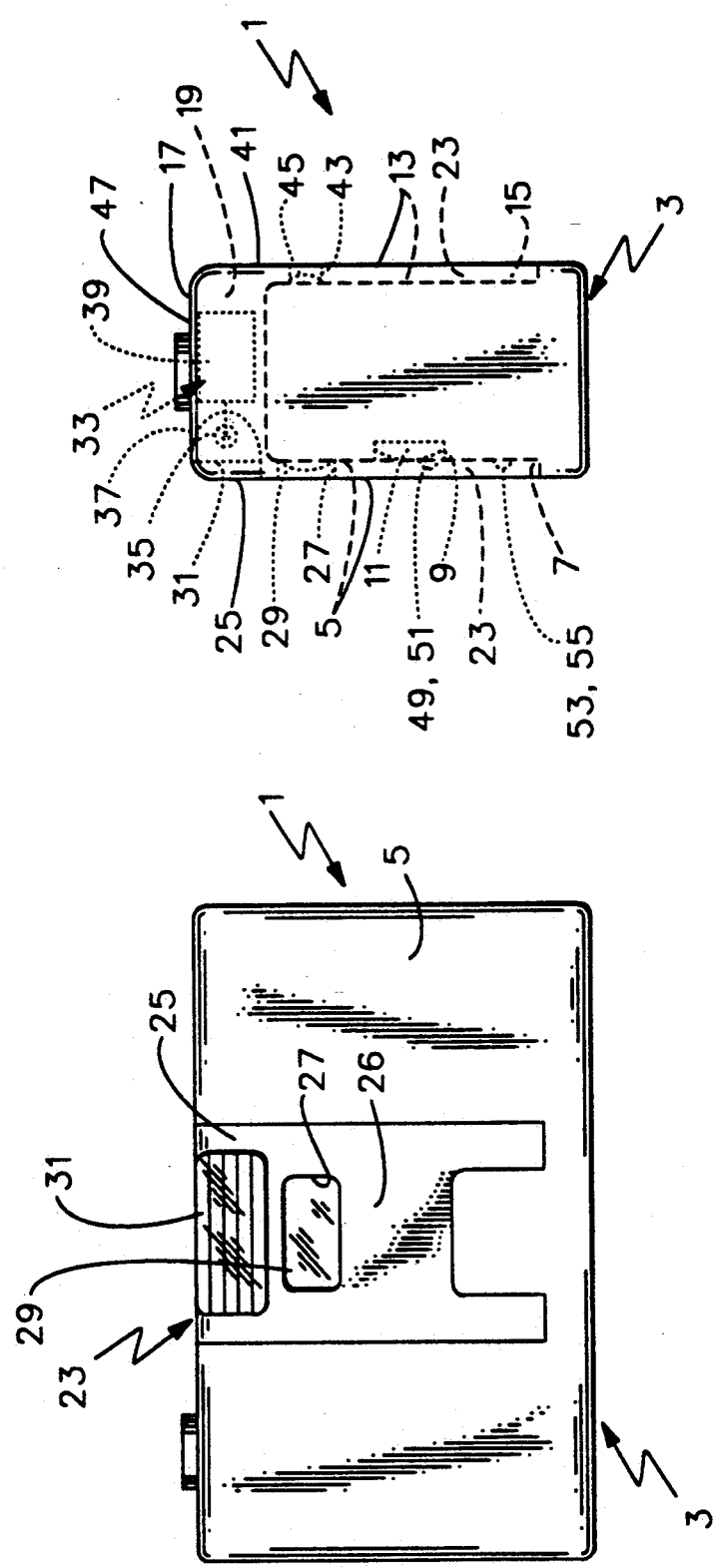

COMPACT CAMERA WITH DEPLOYABLE FLASH UNIT

CROSS-REFERENCE TO A RELATED APPLICATION

Reference is made to commonly assigned copending application Ser. No. 07/637855, entitled PHOTOGRAPHIC CAMERA WITH COLLAPSIBLE OPTICAL DEVICE, and filed Jan. 7, 1991 in the name of Samuel F. Swayze.

BACKGROUND OF THE INVENTION

Field of the Invention

The invention relates generally to the field of photography, and in particular to photographic cameras. More specifically, the invention relates to a compact camera with a deployable or extendable flash unit.

Description of the Art

Nowadays it is an important objective in designing cameras to provide one that is relatively compact or miniaturized. Toward this end there has been designed various cameras with one or more collapsible or foldable functional components. For example, U.S. Pats. No. 4,589,747, issued May 20, 1986, and 4,299,465, issued Nov. 10, 1981, each disclose a compact camera having an electronic flash unit that is supported for movement between a storage or non-firing position integrated substantially with the camera body and an operative or firing position extended substantially from the camera body. Also, U.S. Pat. No. 3,685,414, issued Aug. 22, 1972, discloses a compact camera having a viewfinder sleeve that is supported for movement between a storage or retracted position encasing one end portion of the camera body and an operative or viewing position extended from that end portion of the camera body.

PROBLEM TO BE SOLVED BY THE INVENTION

To-date, many camera designs continue to leave room for improvement with respect to compactness. For example, the typical camera viewfinder usually occupies a significant amount of volume within the camera body. However, the volume is mostly empty; that is, it serves as the viewfinder airspace.

THE CROSS-REFERENCED APPLICATION

The cross-referenced application discloses a compact camera wherein a viewfinder module can be collapsed into an IR receiver module by interspersing spaced optical elements of the first module between spaced optical elements of the second module.

SUMMARY OF THE INVENTION

According to the invention, a compact camera comprising a flash unit, conveyance means supporting the flash unit for movement to separate storage and operative positions, and a viewfinder airspace, is characterized in that:

said flash unit and said viewfinder airspace are relatively sized to fit the flash unit into the viewfinder airspace; and said conveyance means is adapted to support the flash unit for movement into the viewfinder airspace to locate the flash unit in its storage position and for movement out of the viewfinder airspace to locate the flash unit in its operative position. More specifically, the conveyance means is adapted to support a viewfinder window for movement to an operative position in alignment with the viewfinder airspace as the flash unit is moved to its operative position and to a storage position out of alignment with the viewfinder airspace as the flash unit is moved to its storage position.

This arrangement has been found to provide a camera design with improved compactness as compared to prior art cameras.

BRIEF DESCRIPTION OF THE DRAWINGS

FIG. 2 is a front elevation view of the compact camera shown with a flash unit and a viewfinder window in respective operative positions;

FIG. 3 is an end view of the compact camera as shown in FIG. 2;

FIG. 4 is a front elevation view of the compact camera shown with the flash unit and the viewfinder window in respective storage positions; and FIG. 5 is an end view of the compact camera as shown in FIG. 4.

DETAILED DESCRIPTION OF THE PREFERRED EMBODIMENT

Figure 1:
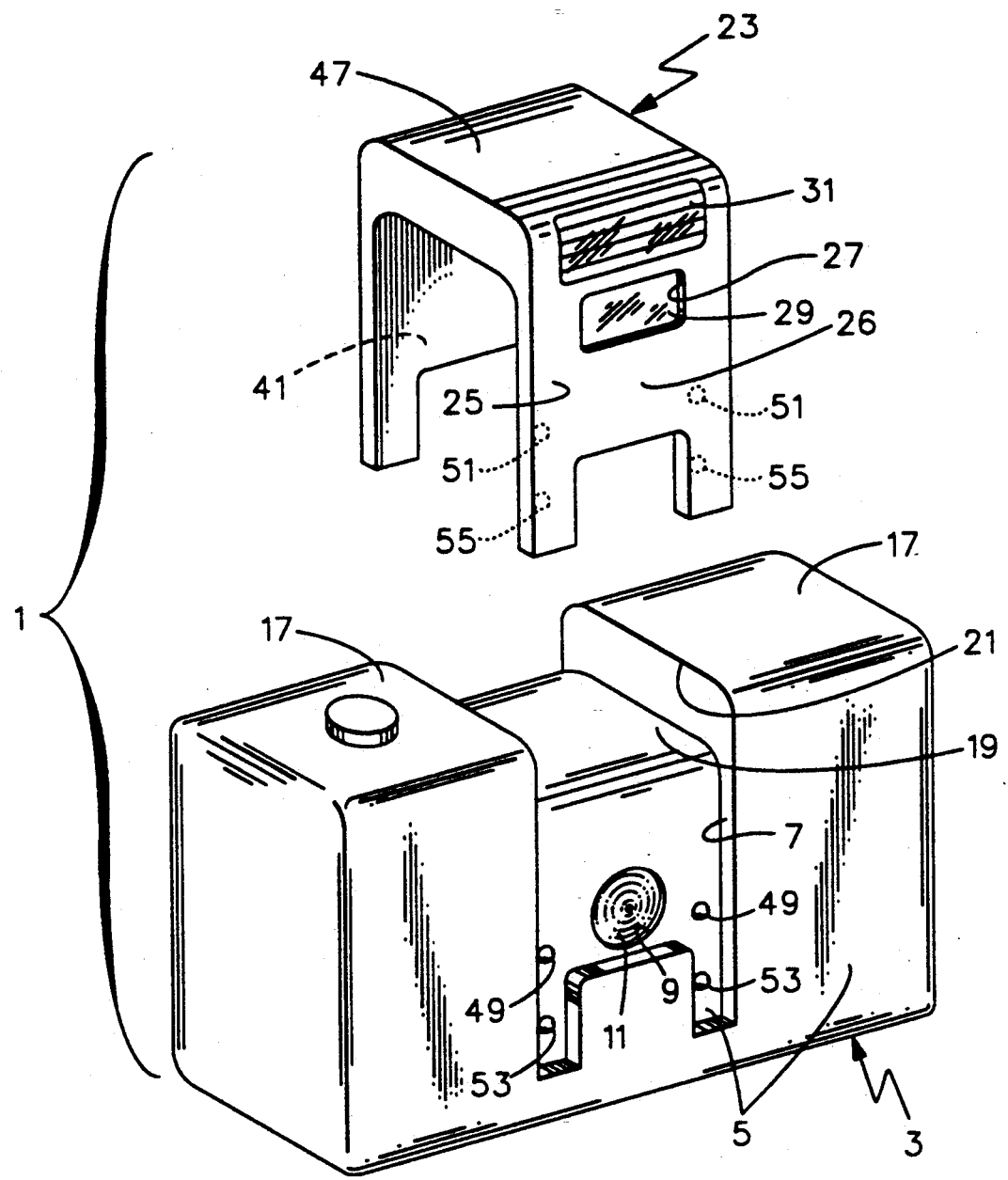
FIG. 1 is a front exploded perspective view of a compact camera according to a preferred embodiment of the invention.

The invention is disclosed as being embodied preferably in a compact 35 mm still camera. Because the features of this type of camera are well known, the description which follows is directed in particular to those elements forming part of or cooperating directly with the preferred embodiment. It is to be understood, however, that other elements not shown or described may take various forms known to persons of ordinary skill in the art.

Referring now to the drawings, FIGS. 1-5 illustrate a compact camera 1 having a camera body or housing 3. The camera body 3 includes a front face 5 having a front cut-out 7 and a lens opening 9 holding a conventional taking lens 11, a rear face 13 having a rear cut-out 15 similar in shape to the front cut-out, a top face 17, and a tunnel-like viewfinder airspace 19 having an ingress/egress (access) opening 21 that opens to the top face. Conveyance means in the form of a sleeve 23 includes a front face 25 having an integral lens cover 26 for the taking lens 11 and the lens opening 9, a front viewfinder window 27 holding a front viewfinder lens 29 and a flash emission window 31 for a conventional electronic flash unit 33 comprising a flash tube 35, a flash reflector 37, and flash electronics 39, a rear face 41 similar in shape to the front face and having a rear viewfinder window 43 holding a rear viewfinder lens 45, and a top face 47. The front and rear viewfinder windows 27 and 43 need not include the front and rear viewfinder lenses 29 and 45. As can be appreciated by looking at FIG. 1, the front and rear faces 25 and 41 of the sleeve 23 reside in the front and rear cut-outs 7 and 15 in the front and rear faces 5 and 13 of the camera body 3 to permit up and down movement in FIGS. 2,3 and 4,5 of the sleeve relative to the camera body. Specifically, the sleeve 23 supports the flash unit 33 and the front and rear viewfinder windows 27 and 43 for coordinated movement of the flash unit into the viewfinder airspace 19 through the ingress/egress opening 21 to locate the flash unit in a storage position shown in FIGS. 4 and 5, and of the front and rear viewfinder windows out of alignment with the viewfinder airspace to locate the viewfinder windows in a storage position shown in FIGS. 4 and 5, and for coordinated movement of the flash unit out of the viewfinder airspace through the ingress/egress opening to locate the flash unit in an operative position shown in FIGS. 2 and 3, and of the viewfinder windows into alignment with the viewfinder airspace to locate the viewfinder windows in an operative position shown in FIGS. 2 and 3. When the flash unit 33 and the front and rear viewfinder windows 27 and 43 are in their respective storage positions shown in FIGS. 4 and 5, the top face 47 of the sleeve 23 is located in conformity with the top face 17 of the camera body 3 to integrate the flash unit substantially with the camera body, and the lens cover 26 is located in covering relationship with the lens opening 9 and the taking lens 11. Conversely, when the flash unit 33 and the front and rear viewfinder windows 27 and 43 are in their respective operative positions shown in FIGS. 2 and 3, the flash emission window 31 is elevated above the top face 17 of the camera body 3 and the lens cover 26 is removed from covering relationship with the lens opening 9 and the taking lens 11.

A first pair of locking projections 49 are formed on the front face 5 of the camera body 3 within the front cut-out 7 to be received in a corresponding pair of cavities 51 formed in the reverse side of the front face 25 of the sleeve 23 to releasably lock the sleeve with the flash unit 33 and the front and rear viewfinder windows 27 and 43 in their respective operative positions shown in FIGS. 2 and 3. A second pair of locking projections 53 are formed on the front face 5 of the camera body 3 within the front cut-out 7 to be received in a corresponding pair of cavities 55 formed in the reverse side of the front face 25 of the sleeve 23 to releasably lock the sleeve with the flash unit 33 and the front and rear viewfinder windows 27 and 43 in their respective storage positions shown in FIGS. 4 and 5. Similar pairs of projections and cavities may be located at the rear face 13 of the camera body 3 within the rear cut-out 15 and at the reverse side of the rear face 41 of the sleeve 23.

The invention has been described with reference to a preferred embodiment. However, it will be appreciated that various modifications can be effected within the ordinary skill in the art without departing from the scope of the invention.

I claim:

1. A compact camera comprising a flash unit, conveyance means supporting said flash unit for movement to separate storage and operative positions, and a viewfinder airspace, is characterized in that:
    said flash unit and said viewfinder airspace are relatively sized to fit the flash unit into the viewfinder airspace; and
    said conveyance means is adapted to support said flash unit for movement into said viewfinder airspace to locate the flash unit in its storage position and for movement out of the viewfinder airspace to locate the flash unit in its operative position.

2. A compact camera comprising a flash unit, conveyance means supporting said flash unit for movement to separate storage and operative positions, a viewfinder airspace, and a viewfinder window, is characterized in that:
    said flash unit and said viewfinder airspace are relatively sized to fit the flash unit into the viewfinder airspace; and
    said conveyance means is adapted to support said flash unit and said viewfinder window for coordinated movement of the flash unit into said viewfinder airspace to locate the flash unit in its storage position and of the viewfinder window out of alignment with the viewfinder airspace to locate the viewfinder window in a storage position and for coordinated movement of the flash unit out of the viewfinder airspace to locate the flash unit in its operative position and of the viewfinder window into alignment with the viewfinder airspace to locate the viewfinder window in an operative position.

3. A compact camera as recited in claim 2, wherein a camera body contains said viewfinder airspace, said viewfinder airspace has an ingress/egress opening for said flash unit that opens to outside said camera body, and said conveyance means is adapted to support said flash unit for movement into and out of said viewfinder airspace through said ingress/egress opening.

4. A compact camera as recited in claim 3, wherein said conveyance means is adapted to locate said viewfinder window immediately in front of said viewfinder airspace when said flash unit and the viewfinder window are in their respective operative positions and to locate the viewfinder window immediately in front of a front face of said camera body when the flash unit and the viewfinder window are in their respective storage positions.

5. A compact camera as recited in claim 4, wherein said conveyance means includes an integral cover for a taking lens opening in said front face of said camera body and is adapted to locate said cover immediately in front of said taking lens opening when said flash unit and said viewfinder window are in their respective storage positions and to locate the lens cover removed from the taking lens opening when the flash unit and the viewfinder window are in their respective operative positions.

6. A compact camera as recited in claim 2, wherein said viewfinder window is formed in said conveyance means.

7. A compact camera comprising a camera body, a flash unit, and conveyance means supporting said flash unit for movement to a storage position integrated substantially with said camera body and an operative position extended substantially from the camera body, and a viewfinder airspace contained in said camera body, is characterized in that:
    said viewfinder airspace has an ingress/egress opening for said flash unit that opens to a top face of said camera body;
    said flash unit and said viewfinder airspace are relatively sized to fit the flash unit into the viewfinder airspace through said ingress/egress opening to integrate the flash unit substantially with said camera body; and
    said conveyance means is adapted to support said flash unit for movement into and out of said viewfinder airspace through said ingress/egress opening to locate the flash unit in its storage and operative positions.

* * * * *